United States Patent
Fallon

(10) Patent No.: US 11,223,228 B2
(45) Date of Patent: Jan. 11, 2022

(54) ARTIFICIALLY INTELLIGENT UNINTERRUPTIBLE POWER SUPPLY

(71) Applicant: SCHNEIDER ELECTRIC IT CORPORATION, Foxboro, MA (US)

(72) Inventor: Raymond M. Fallon, Oranmore (IE)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/447,448

(22) Filed: Jun. 20, 2019

(65) Prior Publication Data

US 2020/0403441 A1    Dec. 24, 2020

(51) Int. Cl.
| | |
|---|---|
| H02M 7/04 | (2006.01) |
| H02M 7/44 | (2006.01) |
| H02J 9/06 | (2006.01) |
| G06N 20/00 | (2019.01) |
| G06N 5/02 | (2006.01) |

(52) U.S. Cl.
CPC .............. *H02J 9/061* (2013.01); *G06N 5/025* (2013.01); *G06N 20/00* (2019.01)

(58) Field of Classification Search
CPC .......... H02J 9/061; G06N 20/00; G06N 5/025
See application file for complete search history.

(56) References Cited

U.S. PATENT DOCUMENTS

| | | | |
|---|---|---|---|
| 9,362,838 B1* | 6/2016 | Balogh .................. | H02M 7/04 |
| 2001/0033502 A1 | 10/2001 | Blair et al. | |
| 2008/0252144 A1* | 10/2008 | Wang ...................... | H02J 9/062 |
| | | | 307/66 |
| 2009/0158056 A1* | 6/2009 | Anderson ................. | H02J 3/46 |
| | | | 713/300 |

(Continued)

FOREIGN PATENT DOCUMENTS

| | | |
|---|---|---|
| CN | 101218739 B | 6/2010 |
| CN | 102778653 A | 11/2012 |

(Continued)

OTHER PUBLICATIONS

Extended European Search Report from corresponding European Application No. 20179314.8 dated Nov. 16, 2020.

*Primary Examiner* — Jared Fureman
*Assistant Examiner* — Esayas G Yeshaw
(74) *Attorney, Agent, or Firm* — Lando & Anastasi, LLP

(57) ABSTRACT

An aspect of the disclosure includes an uninterruptible power supply (UPS) system comprising a first input configured to receive input AC power, a second input configured to be coupled to an energy storage device having a backup runtime capacity, and a controller. The controller is configured to operate the UPS system to store a plurality of indications each indicating a number of times that the UPS system has regained access to the input AC power within a respective amount of time after the UPS system has stopped providing the output power, analyze the plurality of indications to determine an additional backup runtime capacity for reducing a number of load drops, determine a number of additional energy storage devices that provide the additional backup runtime capacity, and output the determined number of additional energy storage devices to add to attain the additional backup runtime capacity and reduce the load drops.

17 Claims, 10 Drawing Sheets

(56) References Cited

U.S. PATENT DOCUMENTS

| | | | |
|---|---|---|---|
| 2009/0325056 A1* | 12/2009 | Greening | H01M 10/482 429/121 |
| 2010/0105259 A1* | 4/2010 | Wejrzanowski | B63H 21/17 440/3 |
| 2010/0250162 A1* | 9/2010 | White | G01R 31/392 702/63 |
| 2016/0109916 A1 | 4/2016 | Li et al. | |
| 2016/0276870 A1* | 9/2016 | Olsen | H02J 9/061 |
| 2016/0294210 A1* | 10/2016 | Nguyen | H02J 9/06 |
| 2017/0271875 A1* | 9/2017 | Narla | H02S 40/38 |
| 2018/0367612 A1 | 12/2018 | Fallon et al. | |
| 2019/0024634 A1* | 1/2019 | Tarnowski | F03D 7/0284 |
| 2019/0058352 A1 | 2/2019 | Gow et al. | |
| 2019/0067989 A1* | 2/2019 | Beg | H02J 7/0068 |

FOREIGN PATENT DOCUMENTS

| | | |
|---|---|---|
| CN | 106353691 A | 1/2017 |
| KR | 20090036751 A | 4/2009 |
| KR | 100947038 B1 | 3/2010 |

\* cited by examiner

ARTIFICIALLY INTELLIGENT UNINTERRUPTIBLE POWER SUPPLY

BACKGROUND

1. Field of the Disclosure

At least one example in accordance with the present disclosure relates generally to uninterruptible power supplies.

2. Discussion of Related Art

The use of power devices, such as Uninterruptible Power Supplies (UPSs), to provide regulated, uninterrupted power for sensitive and/or critical loads, such as computer systems and other data processing systems, is known. Known UPSs include online UPSs, offline UPSs, line-interactive UPSs, as well as others. Online UPSs provide conditioned AC power as well as back-up AC power upon interruption of a primary source of AC power. Offline UPSs typically do not provide conditioning of input AC power, but do provide back-up AC power upon interruption of the primary AC power source. Line-interactive UPSs are similar to offline UPSs in that they switch to battery power when a blackout occurs but also typically include a multi-tap transformer for regulating the output voltage provided by the UPS.

SUMMARY

According to aspects of the present disclosure, an Uninterruptible Power Supply (UPS) system is provided comprising a first input configured to be coupled to an Alternating Current (AC) power source, and configured to receive input AC power from the AC power source, a second input configured to be coupled to an energy storage device having a backup runtime capacity, and configured to receive input Direct Current (DC) power from the energy storage device, an output configured to provide output power derived from at least one of the input AC power or the input DC power, and a controller configured to operate the UPS system to store a plurality of indications each indicating a number of times that the UPS system has regained access to the input AC power within a respective amount of time after the UPS system has stopped providing the output power, analyze the plurality of indications to determine an additional backup runtime capacity for reducing a number of load drops, determine a number of additional energy storage devices that provide the additional backup runtime capacity, and output the determined number of additional energy storage devices to add to attain the additional backup runtime capacity and reduce the number of load drops.

In an embodiment, the controller is further configured to classify each indication of the plurality of indications into a respective time interval of a plurality of time intervals. In at least one embodiment, each time interval of the plurality of time intervals corresponds to an amount of time between dropping a load and determining that the input AC power is available. In some embodiments, the controller is further configured to determine a respective amount of additional backup runtime provided by each additional energy storage device of a plurality of additional energy storage devices. In one embodiment, determining the number of additional energy storage devices is based on the respective amount of additional backup runtime provided by each additional energy storage device and a respective cost of each additional energy storage device.

In some embodiments, determining the number of additional energy storage devices includes identifying at least one cluster of indications of the plurality of indications classified into at least one time interval of the plurality of time intervals, and determining that adding the at least one additional energy storage device will supplement the backup runtime capacity of the energy storage device by at least the at least one time interval of the plurality of time intervals. In an embodiment, analyzing the plurality of indications includes executing at least one of a machine learning algorithm or one or more fixed rules to determine a number of load drops that may be avoided by adding one or more energy storage devices.

According to one aspect of the disclosure, a non-transitory computer-readable medium storing sequences of computer-executable instructions for determining an optimal amount of backup storage capacity for an Uninterruptible Power Supply (UPS) is provided, the sequences of computer-executable instructions including instructions that instruct at least one processor to control a UPS having a first input configured to be coupled to an Alternating Current (AC) power source, and configured to receive input AC power from the AC power source, a second input configured to be coupled to an energy storage device having a backup runtime capacity, and configured to receive input Direct Current (DC) power from the energy storage device, and an output configured to provide output power derived from at least one of the input AC power or the input DC power to store a plurality of indications each indicating a number of times that the UPS has regained access to the input AC power within a respective amount of time after the UPS has stopped providing the output power, analyze the plurality of indications, determine, based on the analysis of the plurality of indications, an additional backup runtime capacity to reduce a number of load drops, determine a number of additional energy storage devices that provide the additional backup runtime capacity, and output the determined number of additional energy storage devices to attain the additional backup runtime capacity and reduce the number of load drops.

In an embodiment, the instructions are further configured to instruct the at least one processor to classify each indication of the plurality of indications into a respective time interval of a plurality of time intervals. In one embodiment, each time interval of the plurality of time intervals corresponds to an amount of time between dropping a load and determining that the input AC power is available. In at least one embodiment, the instructions are further configured to instruct the at least one processor to determine a respective amount of additional backup runtime provided by each additional energy storage device of a plurality of additional energy storage devices.

In some embodiments, outputting the determined number of additional energy storage devices is based on the respective amount of additional backup runtime provided by each additional energy storage device and on a respective cost of each additional energy storage device. In an embodiment, analyzing the plurality of indications includes executing at least one of a machine learning algorithm or one or more fixed rules.

According to aspects of the disclosure, an Uninterruptible Power Supply (UPS) system is provided comprising a first input configured to be coupled to an Alternating Current (AC) power source, and configured to receive input AC power from the AC power source, a second input configured to be coupled to an energy storage device having a backup runtime capacity, and configured to receive input Direct Current (DC) power from the energy storage device, an output configured to provide output power derived from at least one of the input AC power or the input DC power, and a controller configured to operate the UPS system to determine a baseline of the backup runtime capacity, receive at least one measurement indicative of the backup runtime capacity, determine a degree to which the at least one measurement deviates from the baseline, and output, based on the determination of the degree to which the cluster deviates from the baseline, an indication of an expected lifetime of the energy storage device.

In an embodiment, the controller is further configured to execute a regression analysis to determine the baseline of the backup runtime capacity. In one embodiment, the at least one measurement includes a plurality of measurements, and wherein the controller is further configured to execute a clustering analysis to identify a cluster of one or more measurements of the plurality of measurements. In at least one embodiment, determining the degree to which the at least one measurement deviates from the baseline comprises determining a degree to which the cluster deviates from the baseline.

According to an aspect of the disclosure, a non-transitory computer-readable medium storing sequences of computer-executable instructions for determining an expected lifetime of an energy storage device is provided, the sequences of computer-executable instructions including instructions that instruct at least one processor to control an Uninterruptible Power Supply (UPS) having a first input configured to be coupled to an Alternating Current (AC) power source, and configured to receive input AC power from the AC power source, a second input configured to be coupled to the energy storage device having a backup runtime capacity, and configured to receive input Direct Current (DC) power from the energy storage device, and an output configured to provide output power derived from at least one of the input AC power or the input DC power to determine a baseline of the backup runtime capacity, receive at least one measurement indicative of the backup runtime capacity, determine a degree to which the at least one measurement deviates from the baseline, and output, based on the determination of the degree to which the cluster deviates from the baseline, an indication of an expected lifetime of the energy storage device.

In at least one embodiment, the instructions are further configured to instruct the at least one processor to execute a regression analysis to determine the baseline of the backup runtime capacity. In some embodiments, the at least one measurement includes a plurality of measurements, and wherein the instructions are further configured to instruct the at least one processor to execute a clustering analysis to identify a cluster of one or more measurements of the plurality of measurements, and determine a degree to which the cluster deviates from the baseline.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Figure 1:
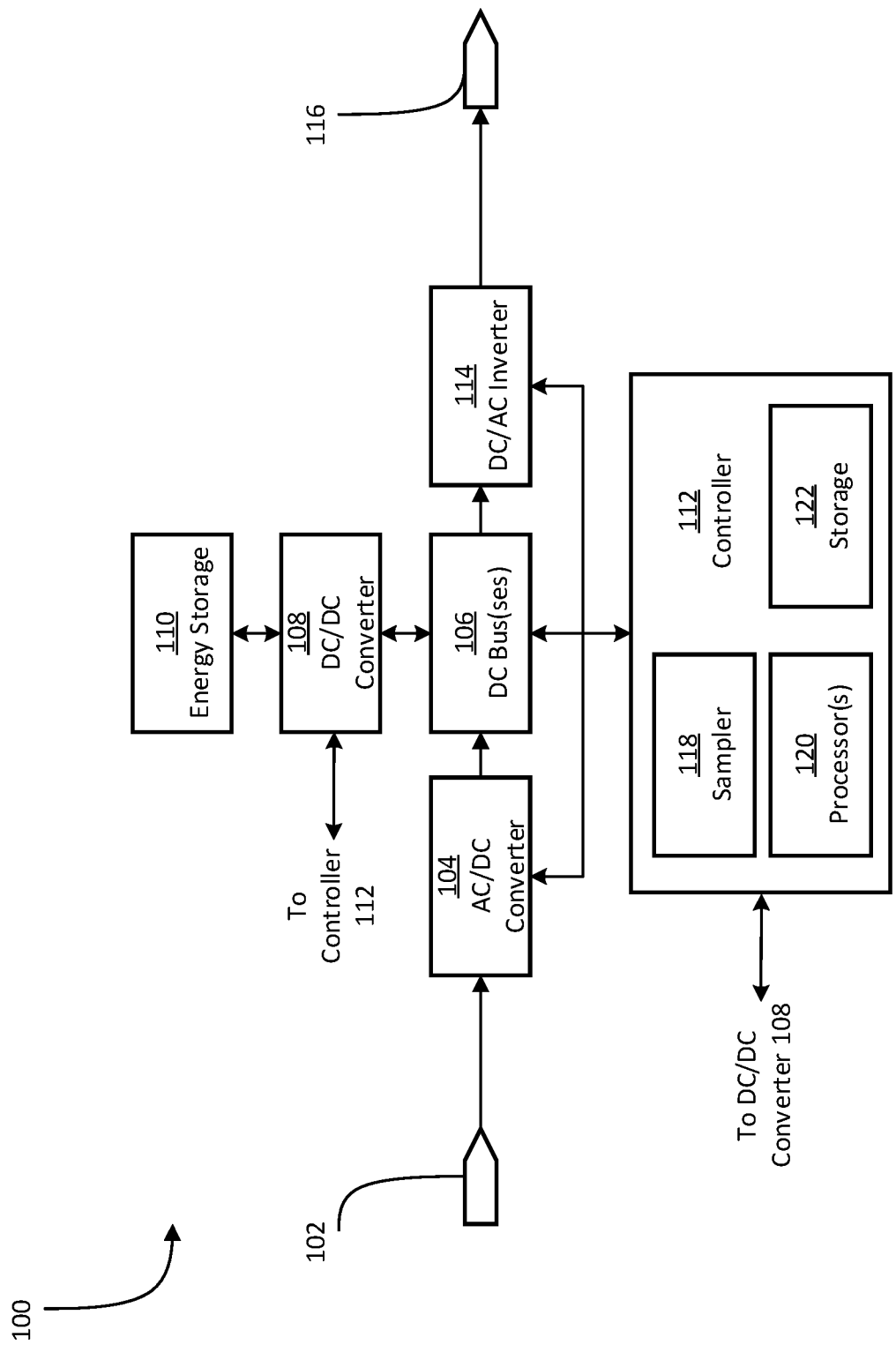
FIG. 1 illustrates a block diagram of an Uninterruptible Power Supply (UPS) according to an embodiment.

FIG. 1 is a block diagram of an Uninterruptible Power Supply (UPS) 100. The UPS 100 includes an input 102, an AC/DC converter 104, one or more DC busses 106, a DC/DC converter 108, energy storage devices 110, a controller 112, a DC/AC inverter 114, and an output 116. The input 102 is coupled to the AC/DC converter 104 and an AC power source (not pictured), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the energy storage devices 110, and is communicatively coupled to the controller 112. The energy storage devices 110, which may include one or more batteries or other energy storage devices, are coupled to the DC/DC converter 108. The DC/AC inverter 114 is coupled to the one or more DC busses 106 and to the output 116, and is communicatively coupled to the controller 112. The output 116 is coupled to the DC/AC inverter 114, and may be coupled to an external load (not pictured).

The input 102 is configured to be coupled to an AC mains power source and to receive input AC power having an input voltage level. The controller 112 is configured to control operation of the UPS 100 in different modes of operation based on whether the UPS 100 determines that the AC power is acceptable.

Determining that the AC power provided to the input 102 is acceptable or not acceptable may include determining electrical parameters of the AC power, and determining if the electrical parameters meet specified conditions. Electrical parameters may include, for example, a voltage amplitude or frequency of the received AC power. Electrical parameters may be acquired by sensors communicatively coupled to, or included in, the controller 112. The controller 112 may determine, based on the electrical parameters, whether the AC power is acceptable.

For example, the controller 112 may determine that the AC power is acceptable if the electrical parameters are within a range of values. For example, if a voltage amplitude of the received AC power is greater than an upper bound of a range of acceptable voltage amplitude values, then the AC power may be determined to be unacceptable. Similarly, if a voltage frequency of the received AC power is lower than a lower bound of a range of acceptable voltage frequencies, then the AC power may be determined to be unacceptable.

If the controller 112 determines that AC power provided to the input 102 is acceptable, the controller 112 may operate the UPS 100 in a normal mode of operation. In the normal mode of operation, AC power received at the input 102 is provided to the AC/DC converter 104. The AC/DC converter 104 converts the AC power into DC power and provides the DC power to one or both of the one or more DC busses 106. The one or more DC busses 106 distribute the DC power to the DC/DC converter 108 and to the DC/AC inverter 114. The DC/DC converter 108 converts the received DC power and provides the converted DC power to the energy storage devices 110 to charge the energy storage devices 110. The DC/AC inverter 114 receives DC power from the one or more DC busses 106, converts the DC power into regulated AC power, and provides the regulated AC power to the output 116 to be delivered to a load.

When the controller 112 determines that AC power provided to the input 102 from the AC mains power source is not acceptable, the controller 112 may operate the UPS 100 in a backup mode of operation. In the backup mode of operation, DC power is discharged from the energy storage devices 110 to the DC/DC converter 108. The DC/DC converter 108 converts the received DC power and distributes the converted DC power to the one or more DC busses 106.

During the backup mode of operation, power distributed to the one or more DC busses 106 is provided by the energy storage devices 110, and during the normal mode of operation, power distributed to the one or more DC busses 106 is provided by a power source connected to the input 102. Power distributed to the one or more DC busses 106 is subsequently drawn by the DC/AC inverter 114 to convert the drawn power from DC power to AC power, and to supply the AC power to an external load connected to the output 116.

As discussed above, the controller 112 may control operation of the UPS 100. In one example, the controller 112 includes a sampler 118, one or more processors 120, and storage 122. The sampler 118 is configured to sample parameters. For example, the sampler 118 may include one or more sensors configured to sense electrical parameters. In one example, electrical parameters include parameters indicative of power received at the input 102, power provided at the output 116, and/or power stored at the energy storage devices 110 as discussed in greater detail below. In another example, the sampler 118 may be configured to be coupled to one or more sensors or other data sources configured to sense environmental parameters and provide information indicative of the environmental parameters to the sampler 118.

Using data stored in associated memory (for example, the storage 122), the controller 112 may execute one or more instructions stored on one or more non-transitory computer-readable media that may result in manipulated data. In some examples, the controller 112 may include one or more processors (for example, the one or more processors 120) or other types of controllers. In another example, the controller 112 includes a Field-Programmable Gate Array (FPGA) controller. In yet another example, the controller 112 performs a portion of the functions disclosed herein on a processor and performs another portion using an Application-Specific Integrated Circuit (ASIC) tailored to perform particular operations. As illustrated by these examples, examples in accordance with the present disclosure may perform the operations described herein using many specific combinations of hardware and software and the disclosure is not limited to any particular combination of hardware and software components.

In some embodiments, the controller 112 may control the UPS 100 according to one or more control algorithms. The one or more control algorithms may be executed in accordance with pre-determined rules which are programmed into the UPS 100 at a time of manufacture. The pre-determined rules may be fixed and not change over time, or the rules may change over time.

In other embodiments, the controller 112 may control the UPS 100 according to one or more control algorithms including machine learning algorithms. Machine learning algorithms may enable the UPS 100 to learn and evolve based on received data, and responsively tune or otherwise alter the machine learning algorithm. For example, machine learning may be based on clustering or regression techniques. In some embodiments, the one or more algorithms may include a combination of machine learning algorithms and fixed, pre-determined rules.

UPS controllers executing machine learning algorithms may be able to achieve advantages relative to UPS controllers executing only pre-determined rules. At least two example implementations of machine learning algorithms are discussed in greater detail below. In a first example, the UPS 100 may execute a machine learning algorithm that enables the UPS 100 to determine a remaining lifetime of one or more of the energy storage devices 110. For example, the controller 112 may determine a normal state of the UPS 100 and the energy storage devices 110. After determining the normal state of the UPS 100 and the energy storage devices 110, the controller 112 may monitor the UPS 100 for abnormal energy storage conditions, which may be indicative of a remaining lifetime of the energy storage devices 110. In some examples, the UPS 100 may responsively provide feedback to a user recommending that the user consider replacing one or more of the energy storage devices 110.

In a second example, the UPS 100 may execute a machine learning algorithm to determine a benefit of connecting additional energy storage devices to the UPS. For example, the UPS 100 may determine a number of load drops that may be avoided by adding additional energy storage devices. As used herein, a load drop may refer to a situation in which the UPS 100 discontinues providing power to the output 116, which may be caused by a cessation of receiving power from the input 102 and a full discharge of the energy storage devices 110, or very low charge where one or more of the energy storage devices 110 are to be protected from full discharge. Responsive to determining the number of load drops that may be avoided by adding additional energy storage devices, the UPS 100 may provide feedback to a user indicating the number of load drops that may be avoided by adding a corresponding number of additional energy storage devices.

Figure 2:
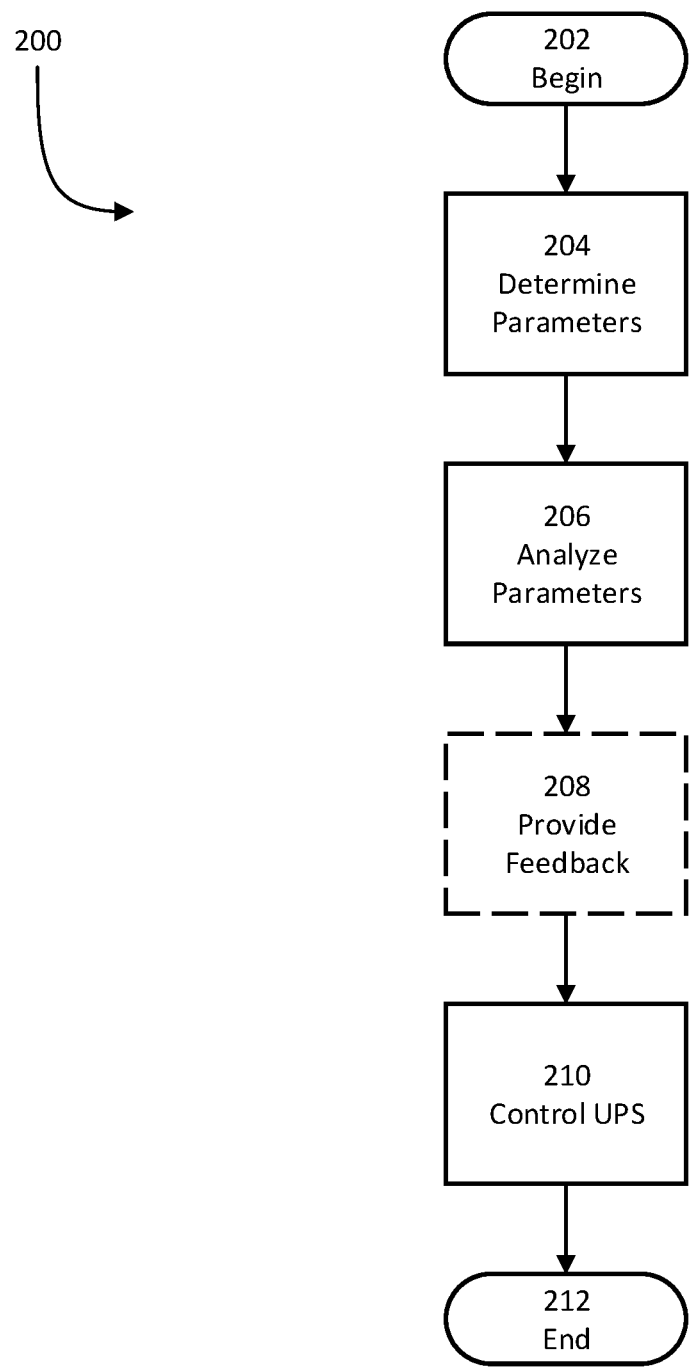
FIG. 2 illustrates a process of controlling the UPS according to an embodiment.

FIG. 2 illustrates a process 200 of controlling a UPS according to an embodiment. For example, the process 200 may be executed by the controller 112. The process 200 includes acts of determining one or more parameters, analyzing the one or more parameters, providing feedback, and controlling the UPS. As discussed in greater detail below with respect to FIG. 9, the UPS 100 may execute a training process prior to execution of the process 200.

At act 202, the process 200 begins. At act 204, parameters are determined. For example, the controller 112 may determine environmental parameters indicative of an environment in which the UPS 100 is implemented. The sampler 118 may determine the environmental parameters by directly sampling the environmental parameters, or by otherwise receiving the environmental parameters.

Environmental parameters may include electrical parameters indicative of an operation and implementation environment of the UPS 100, rather than parameters indicative of the UPS 100 in isolation. For example, environmental parameters may include parameters indicative of ambient temperature, ambient humidity, a quality of utility power received by the UPS 100 (for example, from a utility source at the input 102), a demand from a load connected to the UPS 100, and parameters indicative of the energy storage devices 110, such as voltage, capacity, and temperature parameters, or the physical characteristics such as bulging. Environmental parameters may result in operational differences between two substantially identical UPS s implemented in different localities to optimize the performance of the UPS s based on individual environmental parameters.

At act 206, parameters are analyzed. Analyzing parameters may include analyzing environmental parameters determined at act 204. In a first example, discussed in greater detail below with respect to FIGS. 3-5, analyzing the environmental parameters includes determining a quality or expected lifetime of one or more energy storage devices. In a second example, discussed in greater detail below with respect to FIGS. 6-8, analyzing the environmental parameters includes determining a number of load drops that may be avoided by adding the determined number of additional energy storage devices.

At act 208, feedback is provided. For example, providing feedback may include providing feedback relevant to the UPS 100 to a user based on results of the analysis at act 206. Continuing with the first example discussed above with respect to act 206, feedback may include alerting a user to an expected remaining lifetime of each of the energy storage devices 110. Continuing with the second example discussed above with respect to act 206, feedback may include providing a recommendation to a user indicating a suggested number of additional energy storage devices to those that already exist in energy storage devices 110.

In some examples, act 208 is optional. Act 208 may only be executed if certain conditions are met as a result of the analysis executed at act 206. For example, if it is determined at act 206 that one or more energy storage devices are likely to fail and should be replaced soon, then act 208 may be executed to alert a user of the imminent failure. Otherwise, if it is determined at act 206 that all energy storage devices in use are in a healthy condition and do not need to be replaced soon, then no feedback may be provided. In still other examples, act 208 is not an optional act. Feedback indicative of the results of acts 204 and 206 may always be provided. For example, feedback may be continuously provided to a user via a user interface at act 208, where the feedback may include information indicative of a respective health condition of each of a group of energy storage devices.

At act 210, the controller 112 controls the UPS 100. The controller 112 may control the UPS 100 according to the parameters determined at act 204. For example, the controller 112 may determine, based at least in part on the parameters determined at act 204, that a blackout or brownout condition is imminent from a utility source to which the UPS 100 is connected. In some examples, act 210 is optional and may not be executed. At act 212, the process 200 ends.

Figure 9:
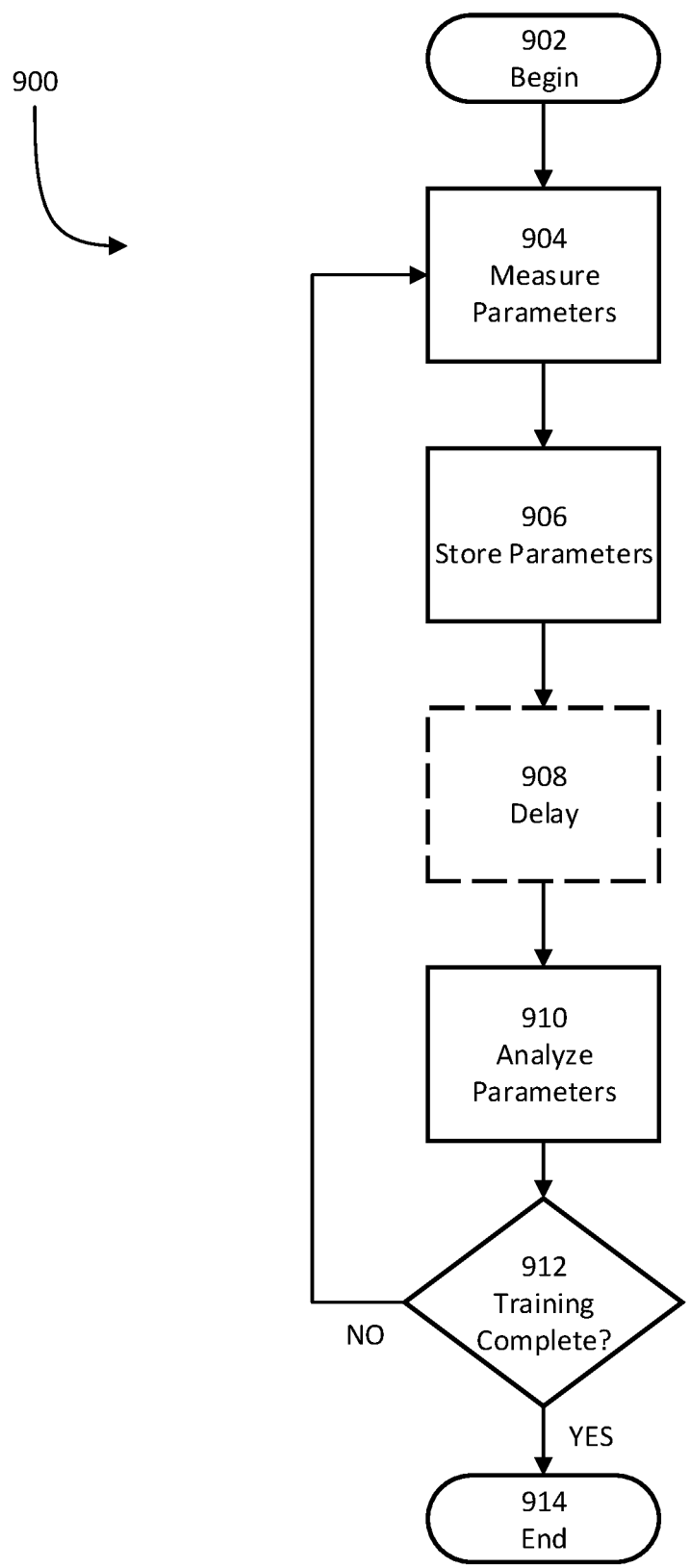
FIG. 9 illustrates a process of training a machine learning algorithm according to an embodiment.

FIG. 9 illustrates a process 900 of training a machine learning algorithm. For example, the process 900 may be executed by the controller 112. The process 900 may be executed to train a machine learning algorithm to determine a condition of one or more energy storage devices. The process 900 includes acts of measuring parameters, storing the parameters, optionally waiting for a delay period, and analyzing the stored parameters.

At act 902, the process 900 begins. At act 904, parameters are determined. For example, parameters may include parameters indicative of a voltage of the energy storage devices 110, a state-of-charge (or "remaining capacity") of the energy storage devices 110, and a current provided at the output 116. At act 906, parameters are stored. For example, parameters determined at act 904 may be stored by the controller 112 in storage 122.

At act 908, an optional delay period may be executed. The duration and/or implementation of the delay period may be selected by a user, or may be determined by the controller 112. At act 910, the parameters are analyzed. In one example, analyzing the parameters includes performing a regression analysis on the parameters to determine a regressed curve corresponding to the parameters. The regressed curve may indicate a baseline condition indicative of the state of the UPS 100 during the training period.

In some embodiments, at act 912, a determination is made as to whether the training period is complete. The training period may be determined to be complete when, for example, a specified amount of time has elapsed, a specified number of data points have been acquired, an input indicating that the training period is to be ended is received from a user, or other conditions are met. If the training period is complete (912 YES), then the process 900 ends at act 914. If the training period is not complete (912 NO), then the process 900 returns to act 904. In some examples, although the training period may be complete at act 912, the machine learning algorithm may continue to evolve over time. The machine learning algorithm may be primed with enough information to be able to make decisions. As the algorithm receives more data, the decisions taken may vary due to a deviance in the environmental conditions.

example, a first trace 302 illustrates an expected voltage over time of the energy storage devices 110 discharging 36 Amperes (A) of current. As illustrated by the first trace 302, the energy storage devices 110 are expected to be fully discharged after approximately seven minutes when providing 36 A of current.

The first trace 302, and other traces of the graph 300, may be determined based on information determined by the controller 112 over several discharge cycles of the energy storage devices 110. The discharge cycles may include situations in which the UPS 100 no longer has access to acceptable-quality utility power at the input 102, and power is therefore drawn from the energy storage devices 110, or when the energy storage devices 110 execute a self-test (i.e., controlling the UPS 100 to be in a battery mode while continuing to provide power to the load). For example, discharge cycle information may be determined by the controller 112 as shown in Table 1, below.

TABLE 1

UPS Capacity and Voltage Over Time

| Time (s) | Sample 1 | | Sample 2 | | Sample 3 | | Sample 4 | |
| --- | --- | --- | --- | --- | --- | --- | --- | --- |
| | Capacity (%) | Voltage (V) | Capacity (%) | Voltage (V) | Capacity (%) | Voltage (V) | Capacity (%) | Voltage (V) |
| 0 | 100 | 13 | 78 | 12 | 100 | 13 | 92 | 12 |
| 10 | 99 | 13 | 75 | 11 | 99 | 13 | 90 | 12 |
| 20 | 96 | 13 | 73 | 11 | 97 | 13 | | |
| 30 | 93 | 13 | 69 | 11 | 93 | 12 | | |
| 40 | 92 | 12 | 64 | 11 | 89 | 12 | | |
| 50 | 88 | 12 | 62 | 10 | 87 | 12 | | |
| 60 | 86 | 12 | | | 84 | 12 | | |
| 70 | 84 | 12 | | | 82 | 11 | | |
| 80 | 82 | 12 | | | | | | |
| 90 | 79 | 11 | | | | | | |
| 100 | 74 | 11 | | | | | | |
| 110 | 72 | 11 | | | | | | |
| 120 | 68 | 12 | | | | | | |
| 130 | 66 | 11 | | | | | | |
| 140 | 62 | 11 | | | | | | |
| 150 | 59 | 10 | | | | | | |

Returning to FIG. 2, in a first example of the process 200, a condition or expected lifetime of one or more of the energy storage devices 110 may be detected. At act 204, parameters indicative of the one or more of the energy storage devices 110 may be determined. Similar to act 904, the parameters may include parameters indicative of the voltage of the energy storage devices 110, the remaining capacity of the energy storage devices 110, and/or a current provided at the output 116. Based on the determination of the condition of the one or more energy storage devices, feedback may be provided to a user at act 208. In one example, feedback may be provided indicating an expected lifetime of one or more energy storage devices. In another example, feedback may be provided indicating that one or more energy storage devices should be replaced (for example, because the one or more energy storage devices are nearing an end of an expected lifetime). Additional examples of providing feedback to a user with respect to one or more energy storage devices' conditions are provided with respect to FIGS. 3-5.

Figure 3:
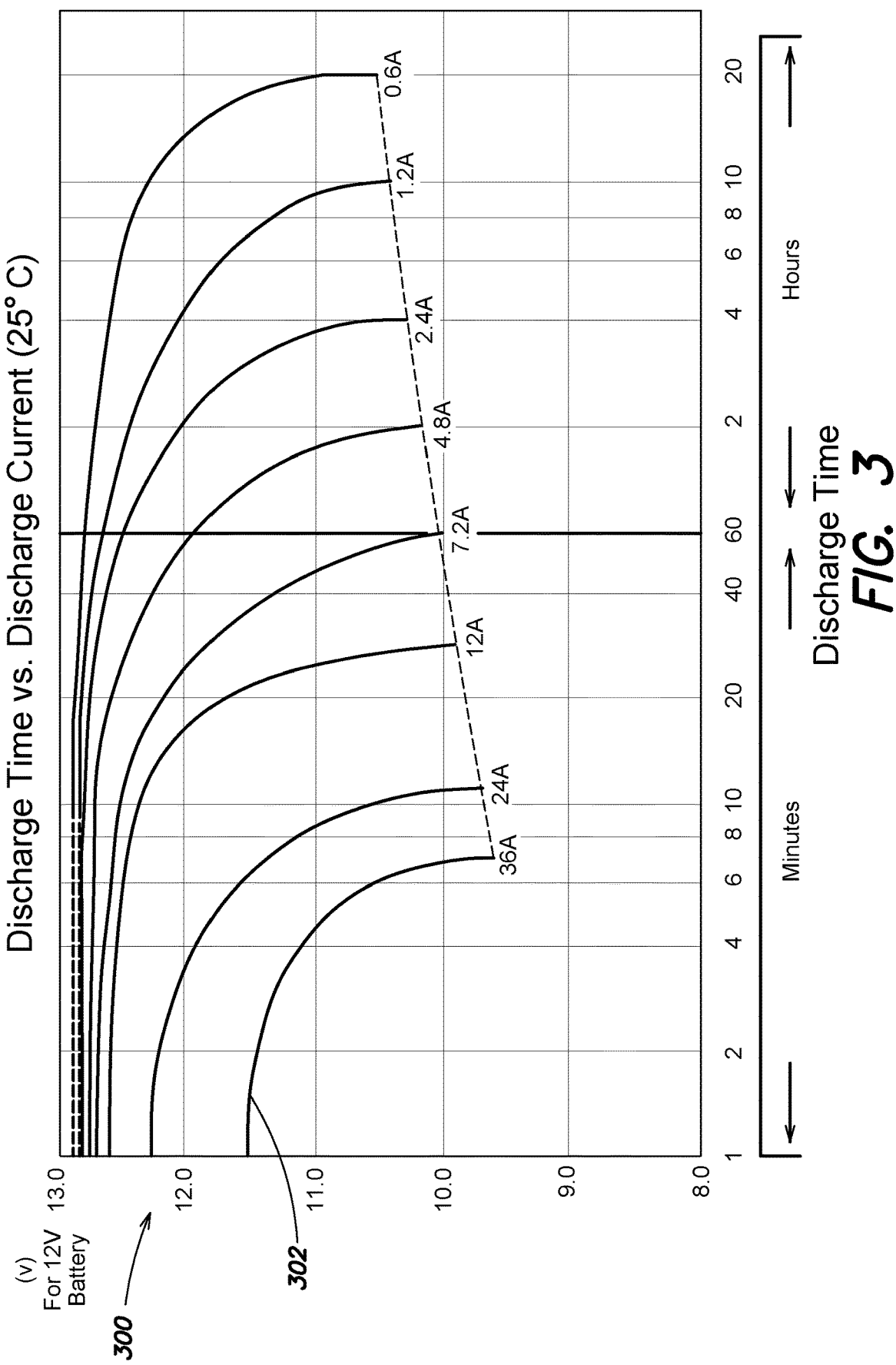
FIG. 3 illustrates a graph of an expected battery voltage over time for various discharge currents.

In some examples, the UPS 100 may determine, based on the training period, parameters of the energy storage devices 110. FIG. 3 illustrates a graph 300 of an expected battery voltage over time for various discharge currents. The graph 300 may correspond to an expected voltage of the energy storage devices 110 for various discharge currents. For The controller 112 may sample a voltage and remaining energy capacity (for example, indicating a remaining stored energy capacity) of the energy storage devices 110 while the energy storage devices 110 are discharging. In some embodiments, the controller 112 may sample the voltage and capacity at regular intervals. For example, as illustrated by Table 1, the controller 112 may sample the voltage and capacity at 10-second intervals for four samples, at least one of which may be a discharge self-test sample. The controller 112 may also determine and store load and ambient temperature information indicating a drawn load current and temperature proximate to the controller 112, respectively, at each sampling interval.

The controller 112 may execute a machine learning algorithm, such as a regression algorithm, to determine a standard discharge curve per load based on the voltage, capacity, load, and/or temperature information. For example, the standard discharge curve may indicate a battery capacity over time for a given load at a given temperature.

Figure 4:
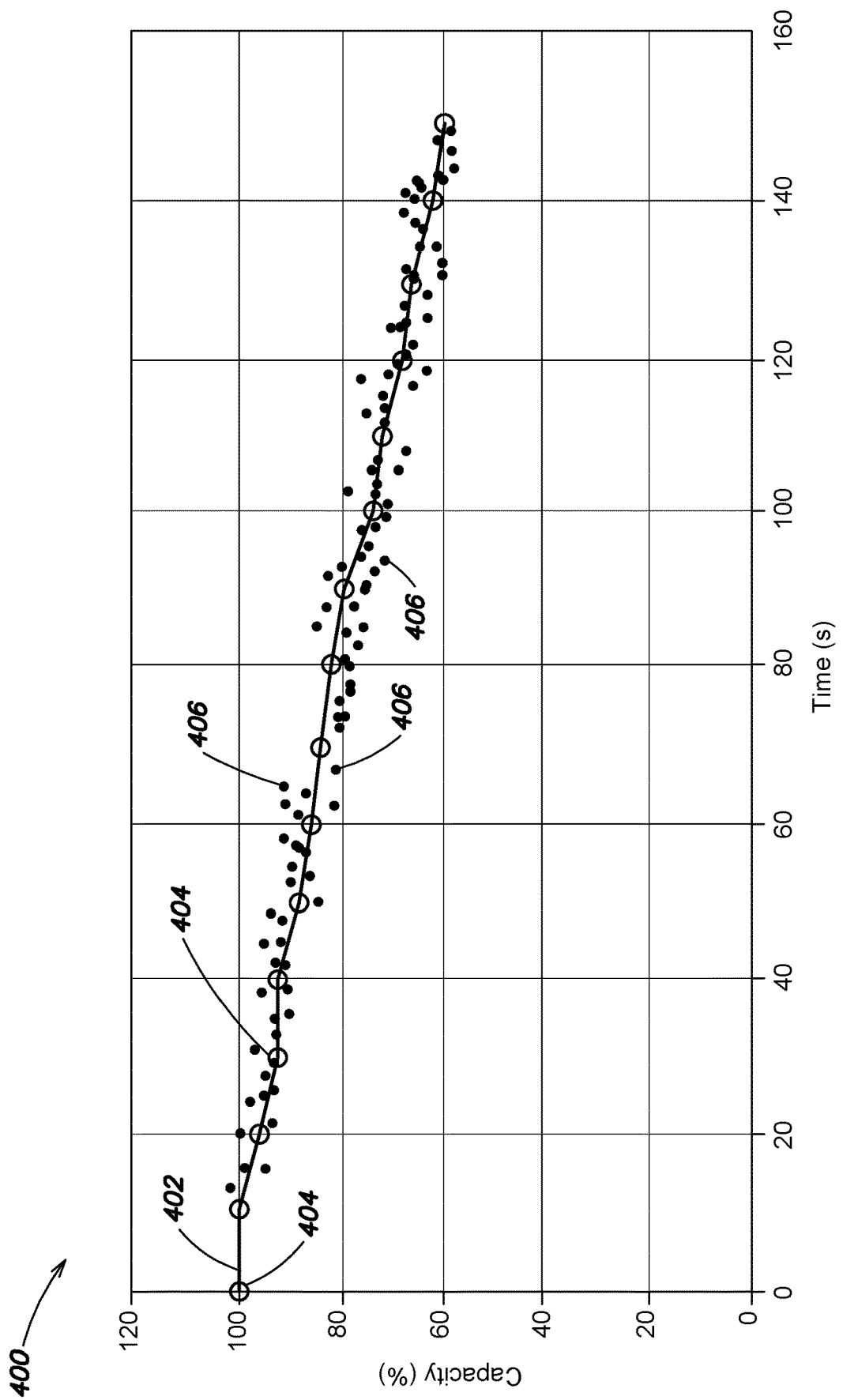
FIG. 4 illustrates a graph indicating a regressed capacity curve according to an embodiment.

Based on the discharge information, a baseline capacity for the energy storage devices 110 may be determined. For example, FIG. 4 illustrates a one example of a graph 400 indicating a regressed capacity curve 402 according to an embodiment. The regressed capacity curve 402 may correspond to the energy storage devices 110 discharging at a specific load (for example, 36 A) and a specific temperature (for example, 25° C.) one or more times. The regressed capacity curve 402 corresponds to a group of regressed data points 404 which have been regressed from a real group of data points 406 by executing a machine learning algorithm. For example, the group of data points 406 may be indicative of a baseline remaining capacity of the energy storage devices 110 determined by the controller 112, as discussed above with respect to Table 1.

As discussed above with respect to act 204, the UPS 100 may continue to determine environmental parameters, which may include parameter's indicative of the remaining capacity of the energy storage devices 110. In examples of act 206, the capacity parameters may be analyzed to identify capacity values that deviate significantly from a baseline, such as the regressed capacity curve 402. For example, FIG. 10 illustrates an example of act 206 that may be executed to identify significant baseline deviations.

Figure 10:
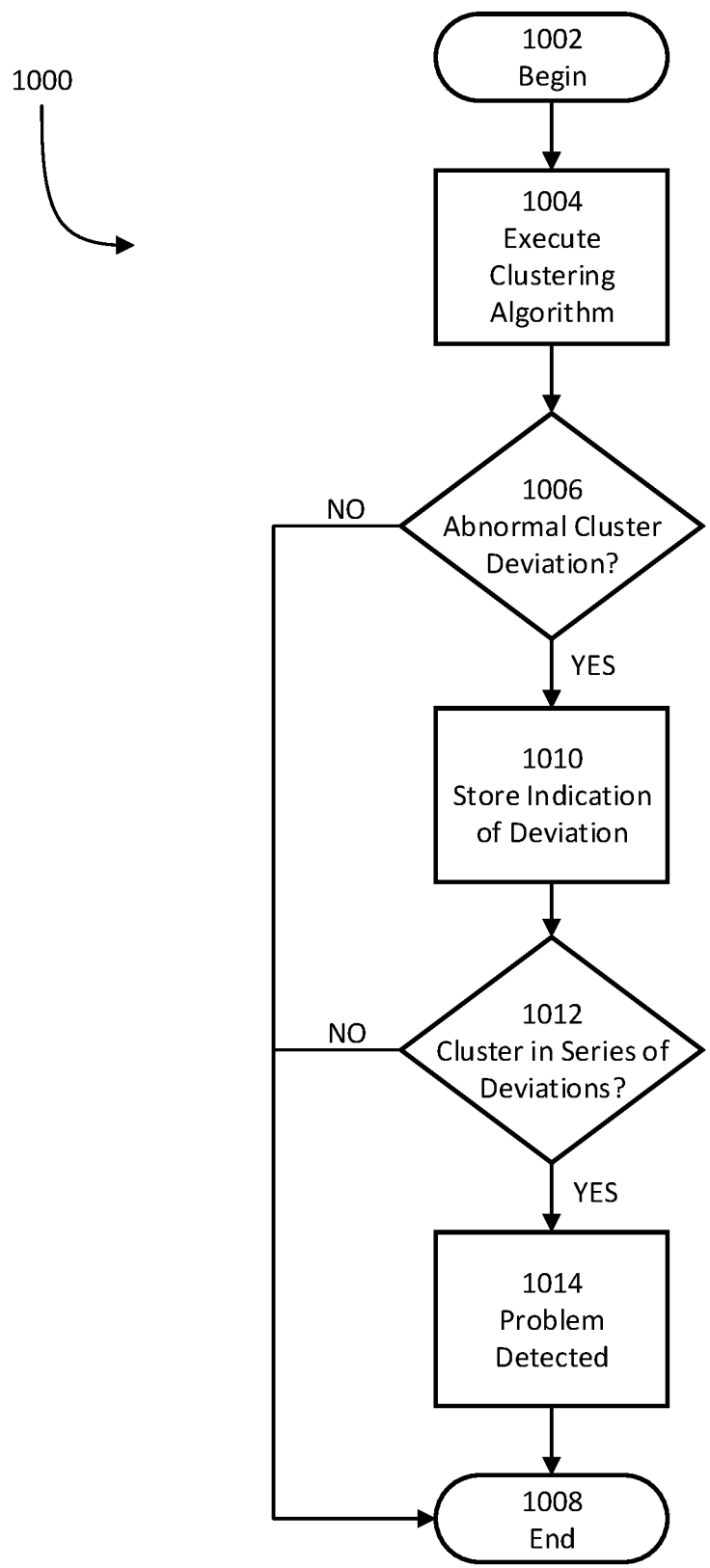
FIG. 10 illustrates a process of analyzing parameters according to an embodiment.

FIG. 10 illustrates a process 1000 of analyzing parameters. For example, the process 1000 may be executed by the controller 112. The process 1000 may illustrate an example implementation of the act 206, as discussed above. The process 1000 includes acts of executing a clustering algorithm, determining if a cluster deviates from a baseline, storing an indication that the cluster has deviated from the baseline, determining if the cluster is one of a series of deviations, and determining that a problem is detected.

At act 1002, the process 1000 begins. At act 1004, a clustering algorithm is executed. For example, the clustering algorithm may be executed on parameters determined at act 204, such as parameters indicative of a remaining energy source capacity associated with one or more energy storage device(s). Executing the clustering algorithm may include executing a machine learning algorithm to identify a cluster, or group, of similar data points. For example, where the parameters are parameters indicative of a remaining energy source capacity for one or more energy storage device(s), a cluster of similar data points may include data points having a similar remaining capacity within a similar range of time. A degree of similarity in remaining capacity and range of time required for data points to be within a single cluster may be determined and updated by the clustering algorithm as the algorithm learns and evolves.

At act 1006, a determination is made as to whether the cluster deviates from a baseline to a degree that the cluster represents an abnormal deviation. As discussed above, a baseline may represent parameters corresponding to energy storage device(s) in a normal and/or healthy condition, and may be represented by a regression curve such as the regression capacity curve 402. Accordingly, a cluster that deviates significantly from the baseline may be indicative of an energy storage device that is not in a normal and/or healthy condition, and therefore may need to be replaced. A degree to which the cluster must deviate from the baseline to be considered an abnormal deviation may be determined by the clustering algorithm as the algorithm learns and evolves to identify normal and abnormal deviations. If the cluster does not abnormally deviate from the cluster (1006 NO), then the process 1000 ends at act 1008. Otherwise, if the cluster abnormally deviates from the baseline (1006 YES), then the process continues to act 1010. The algorithm may react to a pattern of deviations that may represent a problem with the energy storage devices or the UPS system 100.

At act 1010, an indication of the deviation is stored. For example, the controller 112 may store an indication of the deviation in the storage 122. At act 1012, a determination is made as to whether the cluster is one of a series of deviations. For example, if a threshold number of abnormal clusters have been previously detected for the energy storage device(s) associated with the cluster, then the cluster may be considered to be one of a series of deviations.

If the cluster is not one of a series of deviations, then the process 1000 ends at act 1008. Otherwise, if the cluster is one of a series of deviations, then the process 1000 continues to act 1014. At act 1014, a determination is made that a problem has been detected. For example, the problem may be that one or more energy sources are not in a normal and/or healthy condition, as indicated by the series of abnormal remaining capacity parameters deviating from the baseline. As discussed above with act 208, feedback may be provided to a user responsive to detection of an energy storage device that is not in a normal and/or healthy condition. For example, feedback may be provided to a user indicating that the user should consider replacing the energy storage device and/or a graph indicative of the capacity parameters, as discussed below with respect to FIG. 5. At act 1008, the process 1000 ends.

Figure 5:
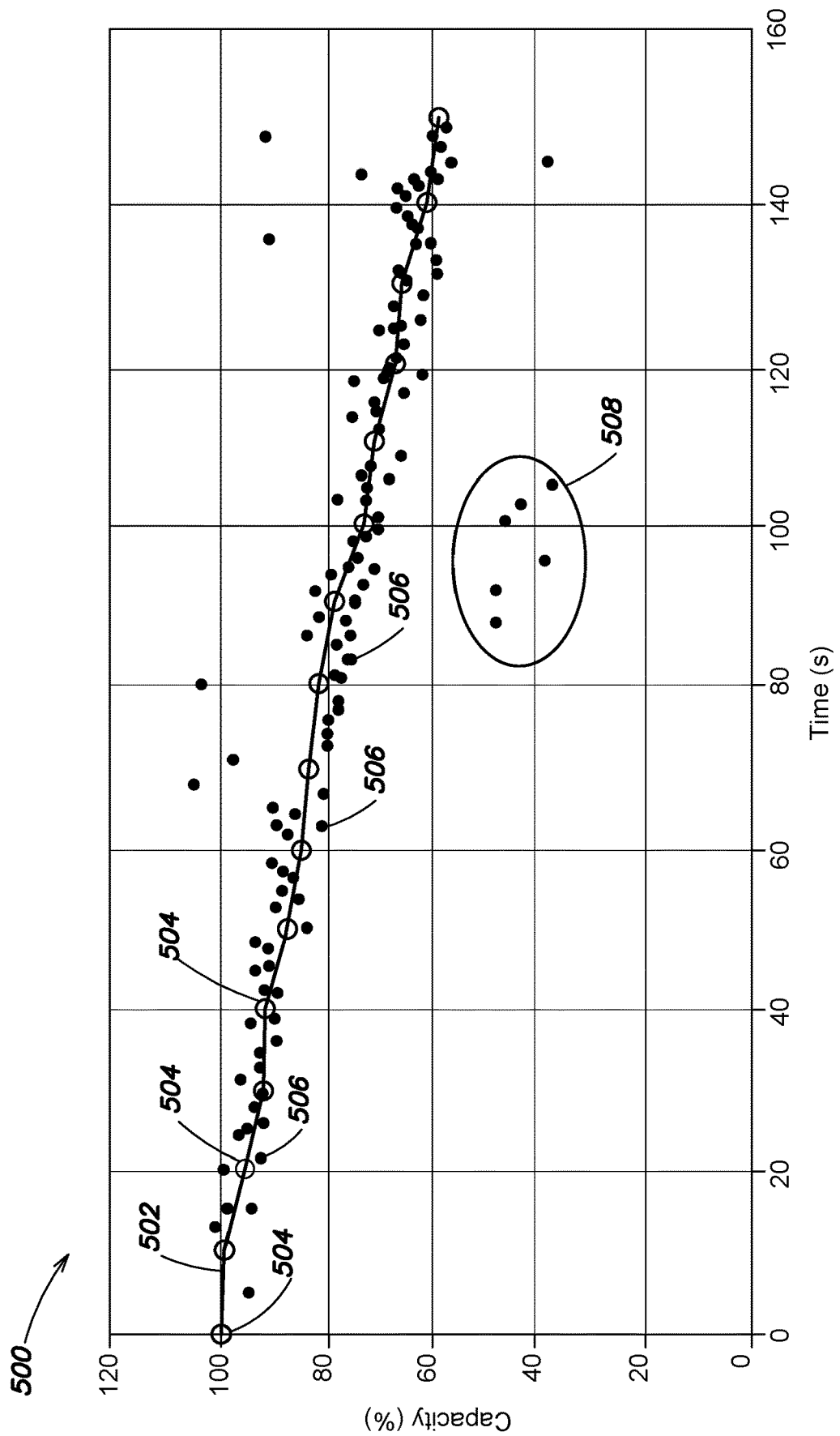
FIG. 5 illustrates a graph indicating a regressed capacity curve according to another embodiment.

FIG. 5 illustrates a graph 500 indicating another regressed capacity curve 502 according to an embodiment. The graph 500 may be similar to the graph 400, except that additional time may have elapsed relative to the graph 400 and/or the condition of the energy storage devices may have declined.

The regressed capacity curve 502 may correspond to the energy storage devices 110, discharging at the same load (for example, 36 A) and the same temperature (for example, 25° C.) for which the regressed capacity curve 402 was determined. The regressed capacity curve 502 corresponds to a group of regressed data points 504 which have been regressed from a group of data points 506 by executing a machine learning algorithm. For example, the group of data points 506 may be indicative of a remaining capacity of the energy storage devices 110 determined by the controller 112, as discussed above with respect to Table 1.

The graph 500 includes a group of outlier data points 508, which may be identified responsive to execution of a clustering algorithm as discussed above with respect to act 1004. The group of outlier data points 508 indicates that the capacity of the energy storage devices 110 are approximately 30% lower than a capacity value predicted by the regressed capacity curve 502 at a similar discharge time. The significant decrease in capacity represented by the group of outlier data points 508 as compared to the regressed capacity curve 502 may indicate that the energy storage devices 110 are failing. The controller 112 may detect the deviation of the group of outlier data points 508 from the regressed capacity curve 502 and determine that the energy storage devices 110 are failing. For example, the controller 112 may determine that the energy storage devices 110 are failing based on a determination at act 1012 that the group of outlier data points 508 is one of a series of deviations.

Responsive to determining that the energy storage devices 110 are failing, the controller 112 may take one or more actions. For example, the controller 112 may provide feedback to a user indicating that the energy storage devices 110 should be replaced. Alternatively, the controller 112 may automatically modify one or more settings according to the determination of the imminent failure of the energy storage devices 110. For example, the controller 112 may be configured to initiate a safe shutdown of a load connected to the UPS 100 if the capacity of the energy storage devices 110 falls below a threshold value, or may provide a notification to a user to initiate a safe shutdown of the load. Responsive to determining that the energy storage devices 110 are not operating in an expected condition, the controller 112 may increase the threshold value such that the load will be safely shutdown at a higher capacity value. For example, whereas the energy storage devices 110 might be shut down below a remaining capacity value of 10% in a normal operating condition, the energy storage devices 110 might be shut down below a remaining capacity value of 25% where the controller 112 determines that the energy storage devices 110 are not operating in a normal operating condition.

As discussed above with respect to act 208, providing feedback to a user may include providing suggestions as to an optimal energy storage device capacity. For example, in some embodiments, the energy storage devices 110 may include two or more batteries of the same or differing capacities. A backup runtime of the UPS 100 is partially dependent upon a capacity of the energy storage devices 110. However, a cost of the energy storage devices 110 will increase as the capacity or number of energy storage devices increases. Accordingly, in one embodiment, the controller 112 is configured to provide feedback to a user indicating an optimal backup runtime as compared to the cost of increasing the backup runtime of the UPS 100.

Accordingly, examples of the process 200 provided above enable the UPS 100 to identify energy storage devices that may be nearing an end-of-life condition. The UPS 100 can provide feedback to a user indicative of the devices' end-of-life condition, such as a notification that the devices should be replaced, or a graph such as the graph 500.

As discussed above, determining a lifetime of the energy storage devices 110 and providing feedback thereof is one example of the process 200. In a second example of the process 200, the UPS 100 may be configured to determine an effect of adding one or more additional energy storage devices to the energy storage devices 110. For example, at act 204, the UPS 100 may determine, each time the UPS 100 drops a load, a duration of the load drop. At act 206, the controller 112 may determine, based on an additional capacity of backup power provided by one or more energy storage devices capable of being connected to the energy storage devices 110, how much longer the UPS 100 could have provided power to the load if the one or more additional energy storage devices were to be coupled to the UPS 100.

Figure 6:
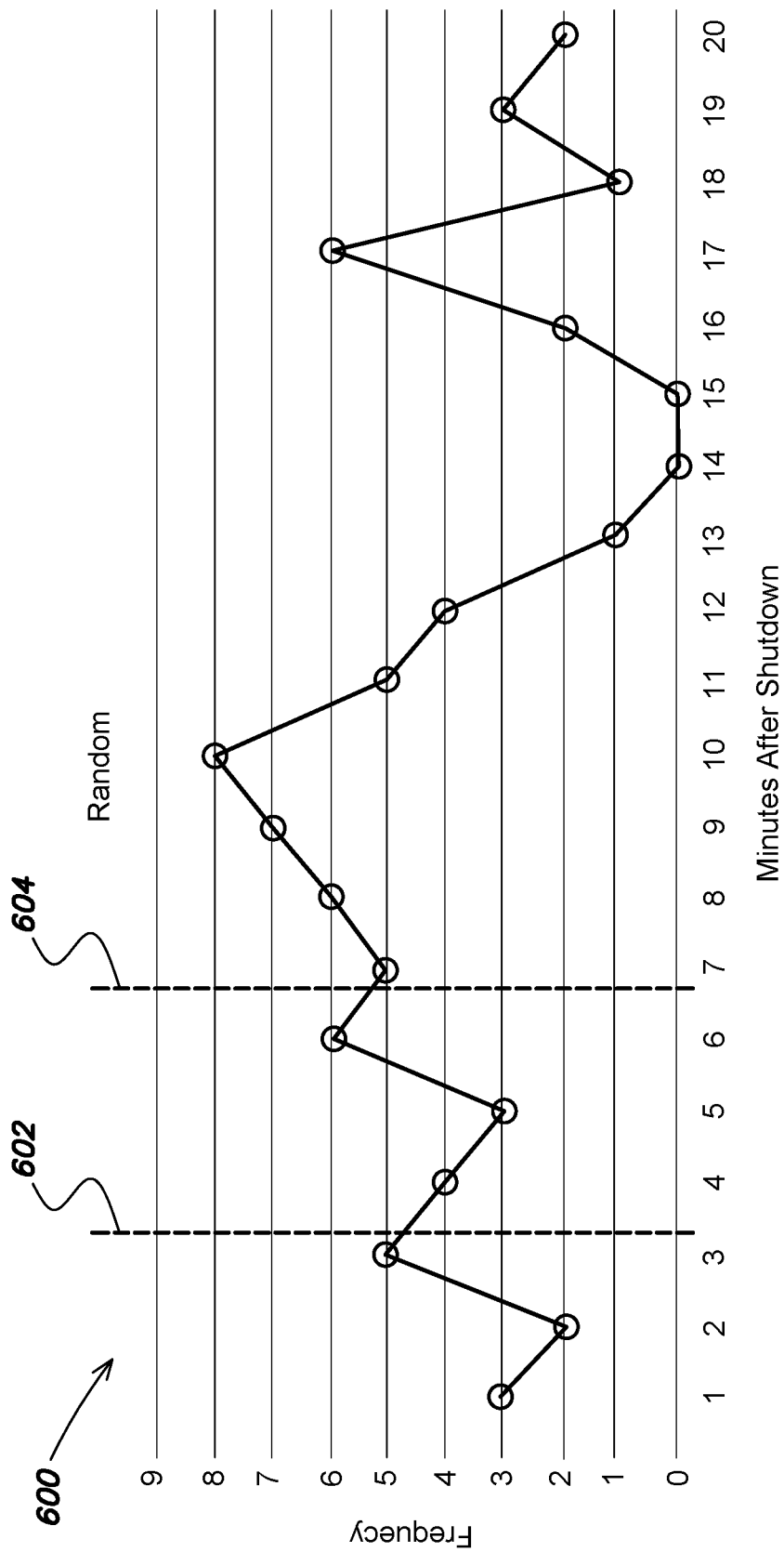
FIG. 6 illustrates a graph indicating a number of times that a power outage condition affecting the UPS persists for longer than a backup runtime of the UPS according to an embodiment.

FIG. 6 illustrates a graph 600 indicating a number of times that a power outage condition affecting a UPS persists for longer than the backup runtime of the UPS. The x-axis of the graph 600 indicates a number of minutes after the UPS 100 stops providing power to a load (for example, because the energy storage devices 110 have been discharged below a minimum operating capacity) that the UPS 100 regains access to utility power. In some embodiments, the x-axis may indicate a number of seconds or another unit of time. The y-axis of the graph 600 indicates a number of times that the UPS 100 has regained access to utility power after the UPS 100 has stopped providing power to a load connected to the UPS 100.

Each point on the graph 600 indicates a stored indication of the number of times (i.e., the frequency) that the UPS 100 regains access to utility power within a respective amount of time (for example, a number of minutes) after the UPS 100 has stopped providing power to a load. As indicated by the graph 600, the UPS 100 regains access to utility power within one minute after the UPS has stopped providing power to a load three times, regains access to utility power between one and two minutes after the UPS has stopped providing power to a load two times, and regains access to utility power between two and three minutes after the UPS has stopped providing power to a load five times. A first marker 602 indicates an additional amount of UPS 100 runtime if an additional energy storage device were to be added to the energy storage devices 110.

More specifically, the first marker 602 indicates that adding an additional energy storage device to the energy storage devices 110 would increase the backup runtime of the UPS 100 by slightly more than three minutes. Increasing the backup runtime of the UPS 100 by more than three minutes would eliminate shutdowns which would otherwise occur within three minutes of the UPS 100 shutting down without the additional energy storage device. As illustrated by FIG. 6, the UPS 100 regains access to utility power within one minute of shutting down three times, regains access to utility power between one and two minutes of shutting down two times, and regains access to utility power between two and three minutes of shutting down five times, for a total of 10 occurrences within three minutes of shutting down. Thus, increasing the backup runtime of the UPS 100 (for example, by adding energy storage devices) by slightly more than three minutes would reduce a number of shutdowns by 10. The controller 112 may be configured to provide feedback to a user indicating that adding an additional energy storage device would reduce the number of shutdowns by 10 over the last period of time, or represent it as a percentage, to allow the user to decide if the cost of the additional energy storage device is worth reducing the number of shutdowns by 10.

A second marker 604 indicates an additional amount of runtime that could be provided by the UPS 100 if a second additional energy storage device were to be added, in addition to the first additional energy storage device discussed above in connection with the first marker 602. As illustrated by FIG. 6, the UPS 100 regains access to utility power between three and four minutes of shutting down four times, regains access to utility power between four and five minutes of shutting down three times, and regains access to utility power between five and six minutes of shutting down six times, for a total of 13 occurrences between three and six minutes of shutting down. The second marker 604 indicates that adding the two additional energy storage devices would increase the backup runtime of the UPS 100 by slightly less than seven minutes, which would thus reduce a number of shutdowns by an additional 13 as compared to adding only the first additional energy storage device to the energy storage devices 110 or representing it as a percentage which may be more useful for the user. The controller 112 may be configured to provide feedback to a user indicating that adding a second additional energy storage device would reduce the number of shutdowns by 13 or represent this as a percentage of all shutdowns to allow the user to decide if the cost of the second additional storage device is worth reducing the number of shutdowns by 13.

Figure 7:
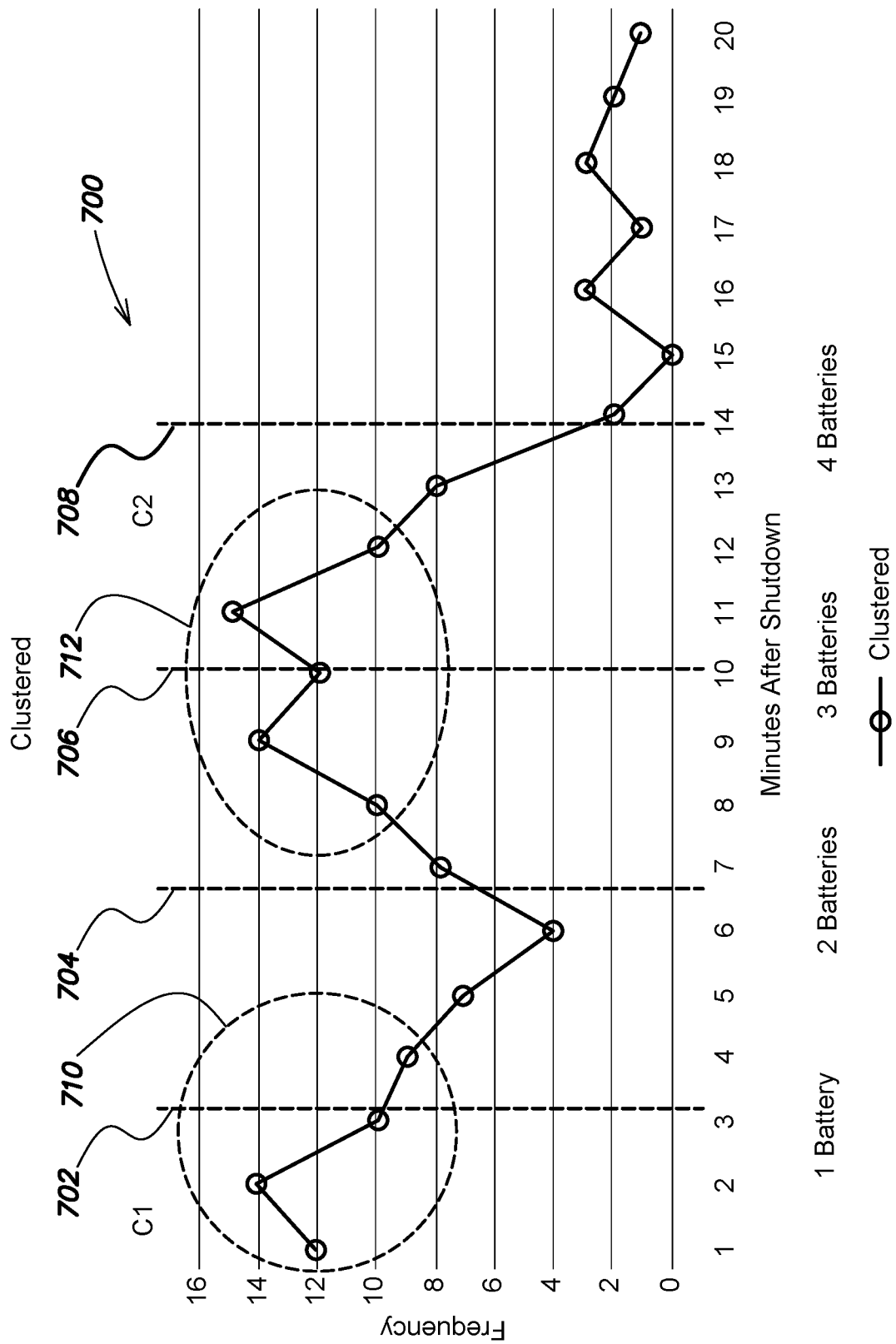
FIG. 7 illustrates a graph indicating a frequency of power returning a number of minutes after the UPS stops providing power to a load according to an embodiment.

Act 206 may further include identifying opportunities for maximizing effectiveness of adding additional energy storage devices to the energy storage devices 110. The UPS 100 may identify load drops with an especially high frequency, and may identify such high-frequency load drops as an opportunity for adding one or more additional energy storage devices to the energy storage devices 110. For example, FIG. 7 illustrates a graph 700 indicating a number of times that a power outage condition affecting a UPS persists for longer than the backup runtime of the UPS. Similar to the graph 600, the graph 700 indicates an additional amount of UPS 100 runtime if additional energy storage devices were to be added to the energy storage devices 110, where each point on the graph 700 indicates a stored indication of the number of times (i.e., the frequency) that the UPS 100 regains access to utility power within a respective number of minutes after the UPS 100 has stopped providing power to a load.

A first marker 702 indicates an additional amount of runtime if one energy storage device were to be added to the energy storage devices 110, a second marker 704 indicates an additional amount of runtime if two energy storage devices were to be added to the energy storage devices 110, a third marker 706 indicates an additional amount of runtime if three energy storage devices were to be added to the energy storage devices 110, and a fourth marker 708 indicates an additional amount of runtime if four energy storage devices were to be added to the energy storage devices 110.

The graph 700 also indicates a first cluster 710 of UPS 100 shutdowns and a second cluster 712 of UPS 100 shutdowns indicative of regions of a relatively high number of shutdowns. The first cluster 710 includes 44 shutdowns, and the second cluster 712 includes 61 shutdowns. The clusters 710, 712 may be identified by a machine learning algorithm executed by the controller 112 at act 206.

For example, the controller 112 may determine that providing enough backup power to maintain the UPS 100 in an operational state during the first cluster 710 and the second cluster 712 (for example, by adding four additional batteries as indicated by the fourth marker 708) is worth the cost of the additional energy storage devices. Accordingly, the controller 112 may provide feedback to a user at act 208 indicating benefits that may be achieved by adding additional energy storage devices. The determination may be based on a cost of adding additional energy storage devices, a criticality of a load coupled to the UPS 100 indicative of an importance of not dropping the load, and a reduction in the number of load drops effected by the additional energy storage devices. Similarly, the controller 112 may determine that adding additional energy storage devices beyond the first cluster 710 and the second cluster 712 would lead to diminishing returns which are not worth the cost of the additional energy storage devices.

Figure 8:
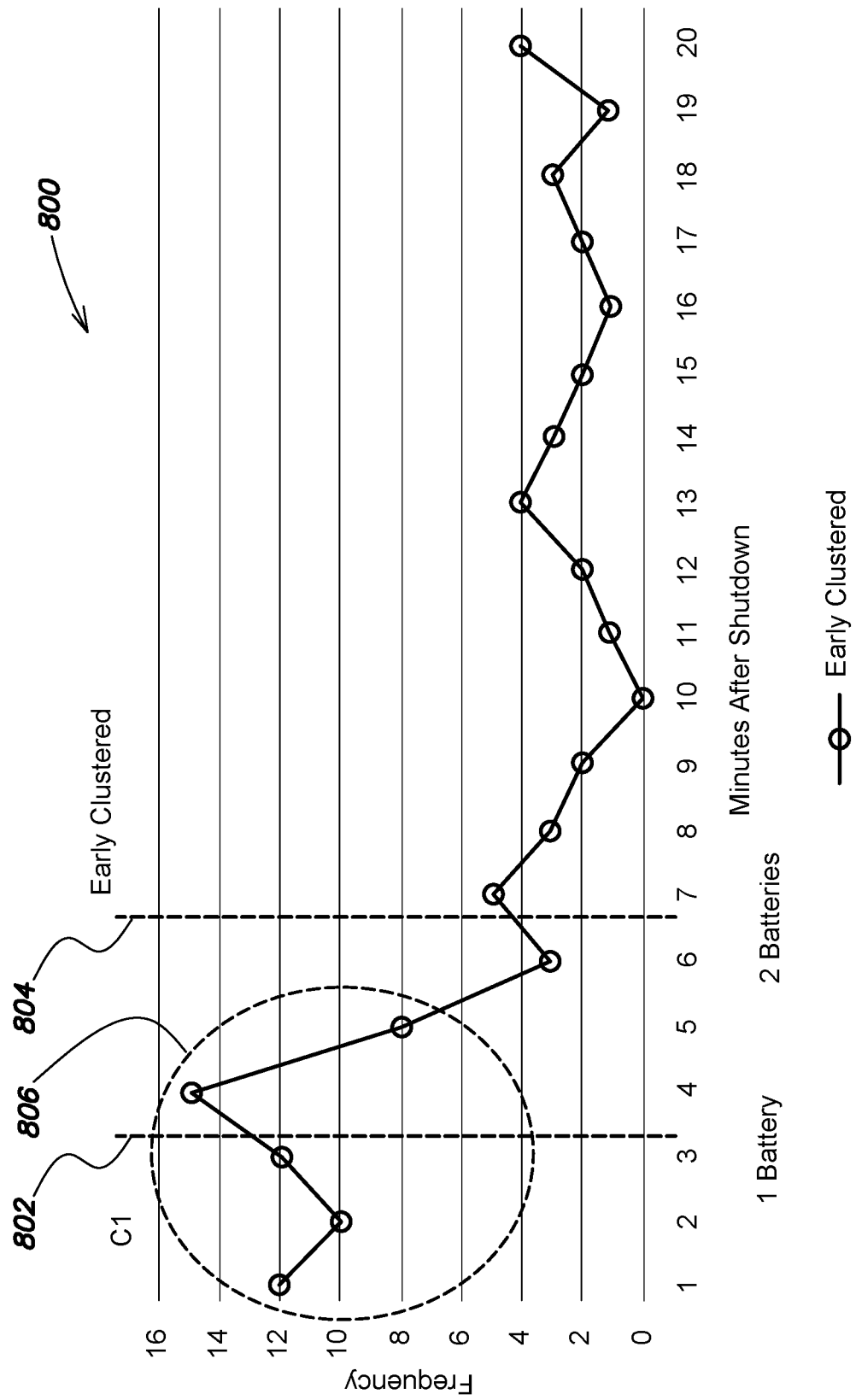
FIG. 8 illustrates a graph indicating a frequency of power returning a number of minutes after the UPS stops providing power to a load according to an embodiment.

FIG. 8 illustrates a graph 800 indicating a number of times that a power outage condition affecting a UPS persists for longer than the backup runtime of the UPS. Similar to the graphs 600 and 700, the graph 800 indicates an additional amount of UPS 100 runtime if additional energy storage devices were to be added to the energy storage devices 110, where each point on the graph 800 indicates a stored indication of the number of times (i.e., the frequency) that the UPS 100 regains access to utility power within a respective number of minutes after the UPS 100 has stopped providing power to a load. A first marker 802 indicates an additional amount of runtime provided by the UPS 100 if one energy storage device were to be added to the energy storage devices 110, and a second marker 804 indicates an additional amount of runtime provided by the UPS 100 if two energy storage devices were to be added to the energy storage devices 110.

The graph 800 also indicates a cluster 806 of UPS 100 shutdowns indicative of a region of a relatively high number of shutdowns. The cluster 806 includes 57 shutdowns, where the cluster 806 may be identified by a machine learning algorithm executed by the controller 112. The controller 112 may determine that, as evidenced by the lack of any clusters of a high frequency of shutdowns after the cluster 806, there may be little benefit to adding any more energy storage devices beyond the amount necessary to address the cluster 806 indicated by the second marker 804. More specifically, while adding two additional energy storage devices would address 60 outages, some of which are captured by the cluster 806, adding any more energy storage devices would address, at most, 33 more outages. Accordingly, the controller 112 may recommend at act 208 that a user install only two additional energy storage devices to address the cluster 806, as any more additional energy storage devices may not be economically advisable.

The controller 112 may adjust a recommendation as to an optimal number of energy storage devices based on a state of the energy storage devices 110. For example, an energy storage capacity of at least one of the energy storage devices 110 may decrease over time as the at least one of the energy storage devices 110 ages. The controller 112 may be configured to continually analyze available information indicative of a capacity of the energy storage devices 110 such that the respective ages of the energy storage devices 110 are continually considered in providing a recommendation as to an optimal number of energy storage devices to add, if any. For example, the UPS 100 may repeatedly execute the process 200. When an energy storage device is replaced (for example, because the battery is failing due to age), the controller 112 may retain the information indicative of the capacity of the replaced energy storage device such that the controller 112 may provide more accurate predictions as to a lifetime of the energy storage devices 110.

As discussed above with respect to FIGS. 6-8, a number of load drops may be classified according to an amount of time after the load is dropped that utility power returns. In the foregoing examples, the numbers of load drops are divided into one-minute intervals. For example, a first time interval indicates a number of times that utility power has returned within a minute of the UPS 100 dropping a load, a second time interval indicates a number of times that utility power has returned between one and two minutes of the UPS 100 dropping a load, and so forth. In other examples, a number of load drops may be classified according to differing or identical time intervals of more than or less than one minute.

As discussed above with respect to act 208, providing feedback to a user may include predicting a utility power failure such that a load powered by the UPS 100 may be safely managed. For example, a server powered by the UPS 100 may be configured to safely shut down or migrate one or more software applications hosted by the server responsive to a prediction, by the UPS 100, that utility power will fail. The outputted feedback may be based on data collected from one or more other UPS, such as the number of load drops within a time period at the one or more other UPS.

Utility power conditions may differ considerably between different geographical regions. For example, certain geographical regions are especially prone to rolling blackouts or brownouts. Others experience blackouts rarely, and some experience electrical spikes or occasional brownouts. In regions which do suffer utility power outages, utility power conditions leading up to the utility power outage may differ considerably. Additionally, utility power outages may be caused by one of several different events (for example, weather conditions and rolling blackouts) each characterized by different location-specific utility power aberrations leading up to the utility power outage.

For example, a first power event in a first geographical location may exhibit different power quality aberrations than the first power event in a second geographical location. Similarly, a first power event in a first geographical location may exhibit different power quality aberrations than a second power event in the first geographical location. Accordingly, in one embodiment, the controller 112 may be configured to analyze local utility power conditions and learn what power conditions typically precede various power events, such that the controller 112 may predict a utility power outage in advance and a load coupled to the UPS 100 may have ample time to prepare for the predicted outage.

The controller 112 may be configured to store information indicative of a quality of power (for example, voltage information or current information) received from the input 102 (for example, from a utility grid) in storage 122. If the power received from the input 102 indicates the presence of a power event, the controller 112 may record the stored information indicative of the quality of power received from the input 102 leading up to the power event and associate the stored information with the power event. As used herein, a power event may include an event which causes a quality of power to deviate from a normal power quality. For example, a power event may include a blackout or brownout condition.

Table 2 indicates stored information indicative of a quality of power received by the UPS 100 at the input 102 corresponding to a first power event. For example, the first power event may include a rolling blackout.

TABLE 2

UPS Voltage and State Patterns

| Time | Voltage (V) | State |
|---|---|---|
| 01:00:00 | 110 | Online |
| 01:01:00 | 108 | Online |
| 01:01:45 | 100 | Smart Boost |
| 01:01:48 | 110 | Online |
| 01:02:00 | 109 | Online |
| 01:03:00 | 112 | Online |
| 01:03:23 | 98 | Smart Boost |
| 01:03:25 | 95 | Smart Boost |
| 01:03:30 | 99 | Smart Boost |
| 01:03:57 | 110 | Online |
| 01:04:00 | 113 | Online |
| 01:05:00 | 112 | Online |
| 01:05:14 | 0 | Blackout |
| 01:05:28 | 0 | Blackout |
| 01:05:29 | 100 | Smart Boost |
| 01:06:00 | 107 | Online |
| 01:07:00 | 110 | Online |

A first column of Table 2 indicates a timestamp at which a corresponding power quality parameter measurement was determined. A second column of Table 2 indicates a voltage measurement corresponding to power received at the input 102 at a respective timestamp. For example, the controller 112 may include, or be coupled to, one or more voltage sensors configured to determine a voltage level of power received at the input 102. A third column of Table 2 indicates a state of the UPS 100 at a corresponding timestamp.

A state of the UPS 100 may include one of an online state, a smart boost state, and a blackout state. The state of the UPS 100 may be determined based on a voltage level of the power received at the input 102. For example, in one non-limiting example, the UPS 100 may be in an online mode if the voltage level is between 105V and 115V, in a smart boost mode if the voltage level is between 97V and 105V, in a smart trim mode if the voltage level is between 115V and 123V, and in a blackout or battery-operated mode otherwise.

The controller 112 may determine a power event indicated by the power quality information by comparing the power quality information to previously-captured power quality information. The controller 112 may continuously learn with increased accuracy what power quality information pattern is indicative of a power event. For example, the controller 112 may determine that periodic fluctuations between an online and smart boost state preceding the UPS 100 not having access to utility power are indicative of rolling blackouts.

Subsequent to determining the power event, the controller 112 may associate the information included in Table 2 with the determined power event. The controller 112 may also store the information included in Table 2 to further refine the controller's 112 ability to identify rolling blackouts characterized by similar power quality patterns.

Each row of information in Table 2 includes a set of data points including a voltage value, a time at which the voltage value was determined, and a state of the UPS 100 at the time at which the voltage value was determined. Each set of data points may be determined at periodic intervals, responsive to certain trigger conditions, or both. For example, in one embodiment, a set of data points is determined every minute. In the same embodiment, a set of data points is also determined if the state of the UPS 100 changes. Accordingly, the controller 112 may be configured to determine a new set of data points every minute, and every time the state of the UPS 100 changes.

Table 3 indicates stored information indicative of a quality of power received by the UPS 100 at the input 102 corresponding to a second power event. For example, the second power event may include a weather condition (for example, including lightning conditions).

TABLE 3

UPS Voltage and State Patterns

| Time | Voltage (V) | State |
|---|---|---|
| 04:34:00 | 110 | Online |
| 04:35:00 | 109 | Online |
| 04:36:00 | 111 | Online |
| 04:37:00 | 112 | Online |
| 04:37:35 | 1000 | On Battery |
| 04:37:36 | 113 | Online |
| 04:38:00 | 110 | Online |
| 04:39:00 | 111 | Online |
| 04:39:15 | 1000 | On Battery |
| 04:39:17 | 110 | Online |
| 04:40:00 | 110 | Online |
| 04:40:15 | 0 | Blackout |
| 04:41:00 | 0 | Blackout |
| 04:42:00 | 0 | Blackout |
| 04:43:00 | 0 | Shutdown |
| 04:44:00 | 108 | Online |
| 04:45:00 | 110 | Online |

The information indicated by Table 3 is similar to the information indicated by Table 2, except that Table 3 corresponds to a second power event which is different than the first power event. For example, whereas the first power event may have been a rolling blackout, the second power event may include a weather condition, such as a storm. Table 2 and Table 3 indicate different power outage patterns indicative of the different power events.

For example, Table 2 indicates voltage sag conditions (for example, 95-99 V) preceding blackout (for example, 0 V) conditions. Table 3 indicates voltage spiking (for example, 1000 V) preceding blackout conditions. The controller 112 may learn that voltage sag conditions and voltage spike conditions tend to precede blackout conditions. Based on this determination, the controller 112 may predict the occurrence of blackout conditions and take actions to mitigate the effects of the blackout conditions.

For example, the UPS 100 may be powering a server which is hosting one or more software applications. If a blackout condition is predicted, it may be advantageous for the server to migrate the one or more software applications or safely shut down the one or more software applications to ensure that the server does not lose power while hosting the one or more software applications. Although the UPS 100 may be capable of powering the server with power supplied by the energy storage devices 110 when utility power is lost, the time necessary to migrate or safely shut down the one or more software applications may exceed the backup runtime of the UPS 100. Accordingly, by being able to predict blackout conditions before they occur, the UPS 100 provides loads with additional time to prepare for the predicted blackout conditions.

In some embodiments, the UPS 100 may directly control the load responsive to determining that blackout conditions are predicted. For example, and continuing with the foregoing example, the UPS 100 may automatically begin a safe shutdown or migration of the one or more software applications hosted by the server responsive to predicting the blackout conditions. In other embodiments, the UPS 100 may provide information to the load indicative of the predicted blackout such that the load may prepare for the predicted blackout. For example, the UPS 100 may provide information indicative of the predicted time until the blackout begins, how long the blackout is expected to last, and how long the UPS 100 is able to provide backup power to the load before the energy storage devices 110 are depleted. In yet another embodiment, the UPS 100 may provide feedback to a user to indicative of the predicted blackout such that the user may operate the load accordingly.

Accordingly, the UPS 100 may be capable of providing valuable information and functionality to loads powered by the UPS 100. By executing machine learning algorithms, the controller 112 is capable of adjusting the functionality of the UPS 100 based on the environmental conditions specific to the UPS 100, which may be difficult or impossible for a static rule-based system.

For example, in one embodiment, the controller 112 may learn that voltage sag conditions in a range of 90V-100V typically precede blackout conditions for the geographical location that the UPS resides. In another embodiment, the controller 112 may learn that voltage sag conditions in a range of 90-100 V are normal and do not precede blackout conditions, but that voltage sag conditions in a range of 50-60 V typically precede blackout conditions for that geographical location. A static rule-based system may not be able to learn of, and differentiate between, these two examples, and therefore can provide only limited blackout prediction information.

Accordingly, the controller 112 may, by executing machine learning algorithms, enhance the functionality of a load coupled to the UPS 100. For example, where the load is a server computer, the UPS 100 may enhance the computer functionality of the server by enabling the server to better prepare for blackout conditions. The server is therefore capable of operating more effectively by mitigating a risk of losing power before the server has safely shut down or migrated one or more software applications executed by the server. The UPS 100 therefore enhances computer functionality by providing loads with additional information and functionality as compared to prior art UPSs.

In some examples, the controller 112 may be coupled to one or more storage elements configured to store information in additional to or in lieu of the storage 122. For example, as discussed above, the controller 112 may determine a state and capacity of energy storage devices over time, where an age of an energy storage device may affect the capacity of the energy storage device. In some embodiments, after replacement of an energy storage device, the controller 112 may store information indicative of the capacity of the replaced energy storage device over time in the one or more storage elements. Storing information indicative of the replaced energy storage device may be beneficial in predicting a state of similar energy storage devices over time. Similarly, the controller 112 may store indications of a duration of each load drop of a plurality of load drops, as discussed above with respect to the data points illustrated in FIGS. 6-8.

Furthermore, as discussed above, the controller 112 may be configured to store power quality pattern information corresponding to various power events. For example, the controller 112 may store power quality pattern information indicative of a pattern of power quality parameter measurements preceding a power event for different power events affecting a quality of power provided to the UPS 100. The controller 112 may be configured to store the power quality pattern information in the controller 122 and/or the one or more storage elements discussed above.

The controller 112 may be coupled to at least one user interface to provide feedback to a user and to allow the user to change settings that alter the UPS behavior. For example, the controller 112 may be communicatively coupled to a Human-Machine Interface (HMI) having a display configured to display information to the user from the controller 112 and allow for configuration of parameters. In other embodiments, the controller 112 may be communicatively coupled to a mobile electronic device carried by a user, such as a mobile phone. For example, the controller 112 may be configured to communicate with the mobile electronic device via a wired or wireless network connection (for example, via an Internet connection). Accordingly, the controller 112 may be configured to provide information to a user locally (for example, via the HMI), remotely (for example, via a network connection), or a combination of both.

Current UPS systems are not designed with the capability to intelligently determine and output a number of additional energy storage devices for a user to add to attain additional backup runtime capacity and reduce the number of load drops. Thus, current systems may leave a user uncertain about how many energy storage devices to add to achieve a desired backup runtime capacity and keep technical equipment operational. This is a technical problem. An exemplary embodiment of an artificially intelligent UPS may comprise a controller that operates the UPS to store indications indicating a duration of a load drop; analyze the indications to determine an additional backup runtime capacity for reducing a number of load drops; and determine a number of additional energy storage devices that provide the additional backup runtime capacity. At least this foregoing combination of features comprises a system design that serves as a technical solution to the foregoing technical problem. This technical solution is not routine, is unconventional, and is not well-understood in the field of UPS design. This technical solution is a practical application of the exemplary system at least because the technical solution solves the foregoing technical problem and constitutes an improvement in the technical field of UPS design by providing a controller configured to make a determination that assists a user with keeping technical equipment operational.

Current UPS systems are not designed with the capability to intelligently determine and output an indication of an expected lifetime of an energy storage device. Thus, current systems may leave a user uncertain about how much longer an energy storage device will properly operate and keep technical equipment operational. This is a technical problem. An exemplary embodiment of an artificially intelligent UPS may comprise a controller that operates the UPS to determine a baseline of a backup runtime capacity; receive one or more measurement indicating a backup runtime capacity; and determine the degree to which one or more of the measurements deviates from the baseline. At least this foregoing combination of features comprises a system design that serves as a technical solution to the foregoing technical problem. This technical solution is not routine, is unconventional, and is not well-understood in the field of UPS design. This technical solution is a practical application of the exemplary system at least because the technical solution solves the foregoing technical problem and constitutes an improvement in the technical field of UPS design by providing a controller configured to make a determination that assists a user with keeping technical equipment operational.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. An Uninterruptible Power Supply (UPS) system comprising:
    a first input configured to be coupled to an Alternating Current (AC) power source, and configured to receive input AC power from the AC power source;
    a second input configured to be coupled to an energy storage device having a backup runtime capacity, and configured to receive input Direct Current (DC) power from the energy storage device;
    an output configured to provide output power derived from at least one of the input AC power or the input DC power; and
    a controller configured to operate the UPS system to:
        store a plurality of indications each indicating a number of times that the UPS system has regained access to the input AC power within a respective amount of time after the UPS system has stopped providing the output power;
        analyze the plurality of indications to determine an additional backup runtime capacity for reducing a number of load drops;
        determine a number of additional energy storage devices that provide the additional backup runtime capacity; and
        output the determined number of additional energy storage devices to add to attain the additional backup runtime capacity and reduce the number of load drops.

2. The UPS system of claim 1, wherein the controller is further configured to classify each indication of the plurality of indications into a respective time interval of a plurality of time intervals.

3. The UPS system of claim 2, wherein each time interval of the plurality of time intervals corresponds to an amount of time between dropping a load and determining that the input AC power is available.

4. The UPS system of claim 3, wherein the controller is further configured to determine a respective amount of additional backup runtime provided by each additional energy storage device of a plurality of additional energy storage devices.

5. The UPS system of claim 4, wherein determining the number of additional energy storage devices is based on the respective amount of additional backup runtime provided by each additional energy storage device and a respective cost of each additional energy storage device.

6. The UPS system of claim 5, wherein determining the number of additional energy storage devices includes identifying at least one cluster of indications of the plurality of indications classified into at least one time interval of the plurality of time intervals, and determining that adding the at least one additional energy storage device will supplement the backup runtime capacity of the energy storage device by at least the at least one time interval of the plurality of time intervals.

7. The UPS system of claim 6, wherein analyzing the plurality of indications includes executing at least one of a machine learning algorithm or one or more fixed rules to determine a number of load drops that may be avoided by adding one or more energy storage devices.

8. A non-transitory computer-readable medium storing sequences of computer-executable instructions for determining an optimal amount of backup storage capacity for an Uninterruptible Power Supply (UPS), the sequences of computer-executable instructions including instructions that instruct at least one processor to control a UPS having a first input configured to be coupled to an Alternating Current (AC) power source, and configured to receive input AC power from the AC power source, a second input configured to be coupled to an energy storage device having a backup runtime capacity, and configured to receive input Direct Current (DC) power from the energy storage device, and an output configured to provide output power derived from at least one of the input AC power or the input DC power to:
    store a plurality of indications each indicating a number of times that the UPS has regained access to the input AC power within a respective amount of time after the UPS has stopped providing the output power;
    analyze the plurality of indications;
    determine, based on the analysis of the plurality of indications, an additional backup runtime capacity to reduce a number of load drops;
    determine a number of additional energy storage devices that provide the additional backup runtime capacity; and
    output the determined number of additional energy storage devices to attain the additional backup runtime capacity and reduce the number of load drops.

9. The non-transitory computer-readable medium of claim 8, wherein the instructions are further configured to instruct the at least one processor to classify each indication of the plurality of indications into a respective time interval of a plurality of time intervals.

10. The non-transitory computer-readable medium of claim 9, wherein each time interval of the plurality of time intervals corresponds to an amount of time between dropping a load and determining that the input AC power is available.

11. The non-transitory computer-readable medium of claim 8, wherein the instructions are further configured to instruct the at least one processor to determine a respective amount of additional backup runtime provided by each additional energy storage device of a plurality of additional energy storage devices.

12. The non-transitory computer-readable medium of claim 8, wherein outputting the determined number of additional energy storage devices is based on the respective amount of additional backup runtime provided by each additional energy storage device and on a respective cost of each additional energy storage device.

13. The non-transitory computer-readable medium of claim 8, wherein analyzing the plurality of indications includes executing at least one of a machine learning algorithm or one or more fixed rules.

14. An Uninterruptible Power Supply (UPS) system comprising:
 a first input configured to be coupled to an Alternating Current (AC) power source, and configured to receive input AC power from the AC power source;
 a second input configured to be coupled to an energy storage device having a backup runtime capacity, and configured to receive input Direct Current (DC) power from the energy storage device;
 an output configured to provide output power derived from at least one of the input AC power or the input DC power; and
 a controller configured to operate the UPS system to:
  determine a baseline of the backup runtime capacity;
  receive at least one measurement indicative of the backup runtime capacity;
  determine a degree to which the at least one measurement deviates from the baseline; and
  output, based on the determination of the degree to which the at least one measurement deviates from the baseline, an indication of an expected lifetime of the energy storage device.

15. The UPS system of claim 14, wherein the controller is further configured to execute a regression analysis to determine the baseline of the backup runtime capacity.

16. The UPS system of claim 14, wherein the at least one measurement includes a plurality of measurements, and wherein the controller is further configured to execute a clustering analysis to identify a cluster of one or more measurements of the plurality of measurements.

17. The UPS system of claim 16, wherein determining the degree to which the at least one measurement deviates from the baseline comprises determining a degree to which the cluster deviates from the baseline.

* * * * *